US011526806B2

(12) United States Patent
Singh et al.

(10) Patent No.: US 11,526,806 B2
(45) Date of Patent: Dec. 13, 2022

(54) DISCOVER UNIDIRECTIONAL ASSOCIATIONS AMONG TERMS OR DOCUMENTS

(71) Applicant: International Business Machines Corporation, Armonk, NY (US)

(72) Inventors: Ritu Singh, San Jose, CA (US); Rakesh Ranjan, Santa Clara, CA (US); Simao Liu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 16/784,954

(22) Filed: Feb. 7, 2020

(65) Prior Publication Data
US 2021/0248508 A1    Aug. 12, 2021

(51) Int. Cl.
*G06N 20/00*    (2019.01)
*G06K 9/62*    (2022.01)
*G06V 10/75*    (2022.01)

(52) U.S. Cl.
CPC ............. *G06N 20/00* (2019.01); *G06K 9/628* (2013.01); *G06K 9/6256* (2013.01); *G06K 9/6268* (2013.01); *G06V 10/75* (2022.01)

(58) Field of Classification Search
CPC ........ G06N 20/00; G06N 3/08; G06K 9/6256; G06K 9/6268; G06K 9/628; G06F 40/30; G06F 16/367
See application file for complete search history.

(56) References Cited

U.S. PATENT DOCUMENTS

| | | | |
|---|---|---|---|
| 9,588,958 B2* | 3/2017 | Danielyan | G06F 40/237 |
| 2017/0228438 A1* | 8/2017 | Chavez | G06N 5/022 |
| 2017/0255603 A1* | 9/2017 | Kajinaga | G06F 40/137 |
| 2019/0384895 A1* | 12/2019 | Jin | G06F 21/6209 |
| 2020/0410116 A1* | 12/2020 | Williamson | G06F 21/6245 |
| 2021/0350247 A1* | 11/2021 | Stoffel | G06N 5/003 |

OTHER PUBLICATIONS

Paukkeri et al., "Learning taxonomic relations from a set of text documents," Proceedings of the International Multiconference on Computer Science and Information Technology, IEEE, Oct. 2010, Wisla, Poland, pp. 105-112.

Tovar et al., "An Approach Based in LSA for Evaluation of Ontological Relations on Domain Corpora," Mexican Conference on Pattern Recognition, Jun. 2017, Huatulco, Mexico, pp. 225-233.

(Continued)

*Primary Examiner* — Margaret G Mastrodonato
(74) *Attorney, Agent, or Firm* — VanLeeuwen & VanLeeuwen; Jorge Maranto

(57) ABSTRACT

An approach is provided in which the approach trains a machine learning model using reference entries included in a reference dataset. During the training, the machine learning model learns a first set of unidirectional associations between the reference entries. The approach inputs a user dataset into the trained machine learning model and generates a second set of unidirectional associations between user dataset entries included in the user dataset. The approach builds a hierarchical relationship of the user dataset based on the second set of unidirectional associations and manages the user dataset based on the hierarchical relationship.

17 Claims, 8 Drawing Sheets

(56) References Cited

OTHER PUBLICATIONS

Bird et al., "Accessing Text Corpora and Lexical Resources," Chapter 2 from Natural Language Processing with Python, distributed with the Natural Language Toolkit, Version 3.0, Sep. 2019, 26 pages.

Granitzer, "Hierarchical Text Classification using Methods from Machine Learning," Master's Thesis at Graz University of Technology, Graz, Austria, Oct. 2003, 104 pages.

Sheena et al., "Automatic Extraction of Hypernym & Meronym Relations in English Sentences Using Dependency Parser," 6th International Conference on Advances in Computing & Communications, ICACC 2016, Sep. 2016, Cochin, India, pp. 539-546.

Thakur, "Is That a Duplicate Quora Question?" linkedin.com, Feb. 2017, 8 pages.

* cited by examiner

Prepared Reference Dataset → 335

| Bus. Term Name (605) | Term Short Description (610) | Term Long Description (615) | Is Type Of-Term Name (620) | Is Type Of-Term Short Description (625) | Is Type Of-Term Long Description (630) | Labels (635) |
|---|---|---|---|---|---|---|
| | | | | | | |
| | | | | | | |
| | | | | | | |
| | | | | | | |
| | | | | | | |

Reference Dataset Feature Learning Results → 345

| Com. Words Name (642) | Hypernyms Name (644) | Hypernyms Doc (646) | Hyponyms Name (648) | Hyponyms Doc (650) | Holonyms Name (652) | Holonyms Doc (654) | Meronyms Name (656) | Meronyms Doc (658) | Fuzz-Q ratio Doc (660) | Fuzz-W ratio Doc (662) | Fuzz-Q ratio Name (664) | Fuzz-W ratio Name (666) | Class Label (668) |
|---|---|---|---|---|---|---|---|---|---|---|---|---|---|
| 2 | .33333 | .12419 | .01851 | .54228 | 0 | .03211 | .01851 | .04975 | 4 | 86 | 56 | 90 | 1 |

*FIG. 6*

User Dataset 320

| User Terms 700 | User Terms Description 710 |
|---|---|
| access token suspended | identifies that the access token has been temporarily deactivated. |
| access token lifecycle status | a classification scheme that distinguishes between access tokens based on their position in a lifecycle model. |
| accident type | a classification scheme that distinguishes between accidents according to the nature of the accident. |
| accident | identifies a peril type where the cause of the claim is due to an unpredicted, unfortunate event. |
| access token | identifies a secure token which is specific and private to an involved party and is used to authenticate the involved party for the purpose of providing access to services. |

Prepared User Dataset 375

| Terms X (Assumed to be Child) 730 | Terms Y (Assumed to be Parent) 740 |
|---|---|
| access token suspended | access token lifecycle status |
| access token lifecycle status | access token suspended |
| access token suspended | accident type |
| accident type | access token suspended |
| access token suspended | accident |
| accident | access token suspended |
| access token suspended | access token |
| access token | access token suspended |
| access token lifecycle status | accident type |
| accident type | access token lifecycle status |
| access token lifecycle status | accident |
| accident | access token lifecycle status |
| access token lifecycle status | access token |
| access token | access token lifecycle status |
| accident type | accident |
| accident | accident type |
| accident type | access token |
| access token | accident type |
| accident | access token |
| access token | accident |
| ... | ... |

742 — (row 1)
744 — (row 2)

*FIG. 7*

| TERM | DOCUMENT |
|---|---|
| 802 — Term X= ['access token suspended'] | Term X Doc = ['Access token suspended. identifies that the access token is currently suspended and is unavailable for use.'] |
| 804 — Term Y = ['access token lifecycle status'] | Term Y Doc = ['a classification scheme that distinguishes between access tokens based on their lifecycle model.'] |

User Dataset Feature Learning Results 385

| TEST | RESULT | |
|---|---|---|
| Feature 1: hypernym_name = hypernyms (Term X, Term Y) | .05 | 812 |
| Feature 2: hypernym_doc = hypernyms(Term X Doc, Term Y Doc) | .095 | 814 |
| Feature 3: hyponym_name = hyponyms(Term X, Term Y) | .026 | 816 |
| Feature 4: hyponym_doc = hyponyms(Term X, Doc Term Y Doc) | .019 | 818 |
| Feature 5: holonym_name = member_holonym(Term X, Term Y) | 0.0 | 820 |
| Feature 6: holonym_doc = member_holonym(Term X, Doc Term Y Doc) | 0.0 | 822 |
| Feature 7: meronym_name = meronyms(Term X, Term Y) | 0.0 | 824 |
| Feature 8: meronym_doc = meronyms(Term X, Doc Term Y Doc) | 0.0 | 826 |
| Feature 9: common_words_name - common word in term X and term Y | 2 | 828 |
| Feature 10: Fuzzy Qratio between Term X Name-Term Y name | 61 | 830 |
| Feature 11: Fuzzy Qratio between Term X document - Term Y document | 41 | 832 |
| Feature 12: Fuzzy WRatio between Term X Name – Term Y Name | 71 | 834 |
| Feature 13: Fuzzy WRatio between Term X document - Term Y document | 41 | 836 |

Unidirectional Association Result 390

Predicted as true directed association;
Term Y = ['access token lifecycle status'] is a Parent of Term X= ['access token expired'];
Term X is a type of Term Y.

*FIG. 8*

DISCOVER UNIDIRECTIONAL ASSOCIATIONS AMONG TERMS OR DOCUMENTS

BACKGROUND

Today's businesses create business catalogs with business terms and manually enter directed associations between the business terms to form hierarchical relationships. Businesses represent enterprise business vocabularies in hierarchies to provide a better understanding of underlying business concepts and assets for a cognitive data governance. Cognitive data governance is an overall cognitive management of data availability, relevancy, usability, integrity and security in an enterprise.

Building hierarchical relations among terms or documents includes discovering unidirectional "Parent->Child" relations. Today's automated approaches detect directed associations between classes where each class has multiple documents. These approaches extract topics from the multiple documents and build a class and hierarchy on the basis that, if all topics of a class (child) is inclusive in the topics in another class (parent), then the classes are considered 'is-a' type association.

BRIEF SUMMARY

According to one embodiment of the present disclosure, an approach is provided in which approach trains a machine learning model using reference entries included in a reference dataset. During the training, the machine learning model learns a first set of unidirectional associations between the reference entries. The approach inputs a user dataset into the trained machine learning model and generates a second set of unidirectional associations between user dataset entries included in the user dataset. The approach builds a hierarchical relationship of the user dataset based on the second set of unidirectional associations and manages the user dataset based on the hierarchical relationship.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram depicting a prepared reference dataset for "is type of" associations and reference dataset feature learning results;

FIG. 7 is an exemplary diagram depicting a user dataset and a prepared user dataset; and FIG. 8 is an exemplary diagram depicting user dataset feature learning results and unidirectional association results.

DETAILED DESCRIPTION

Figure 1:
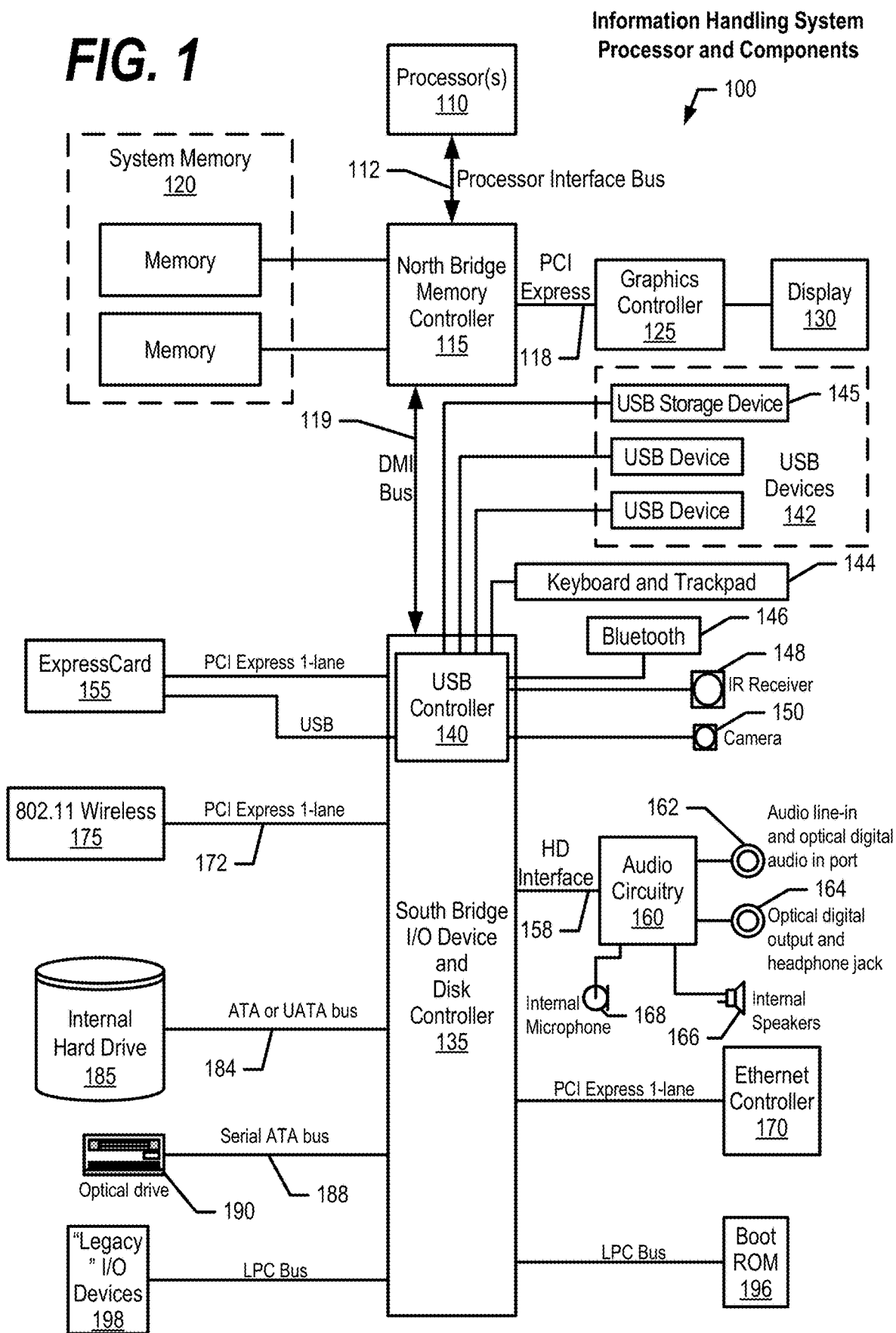
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
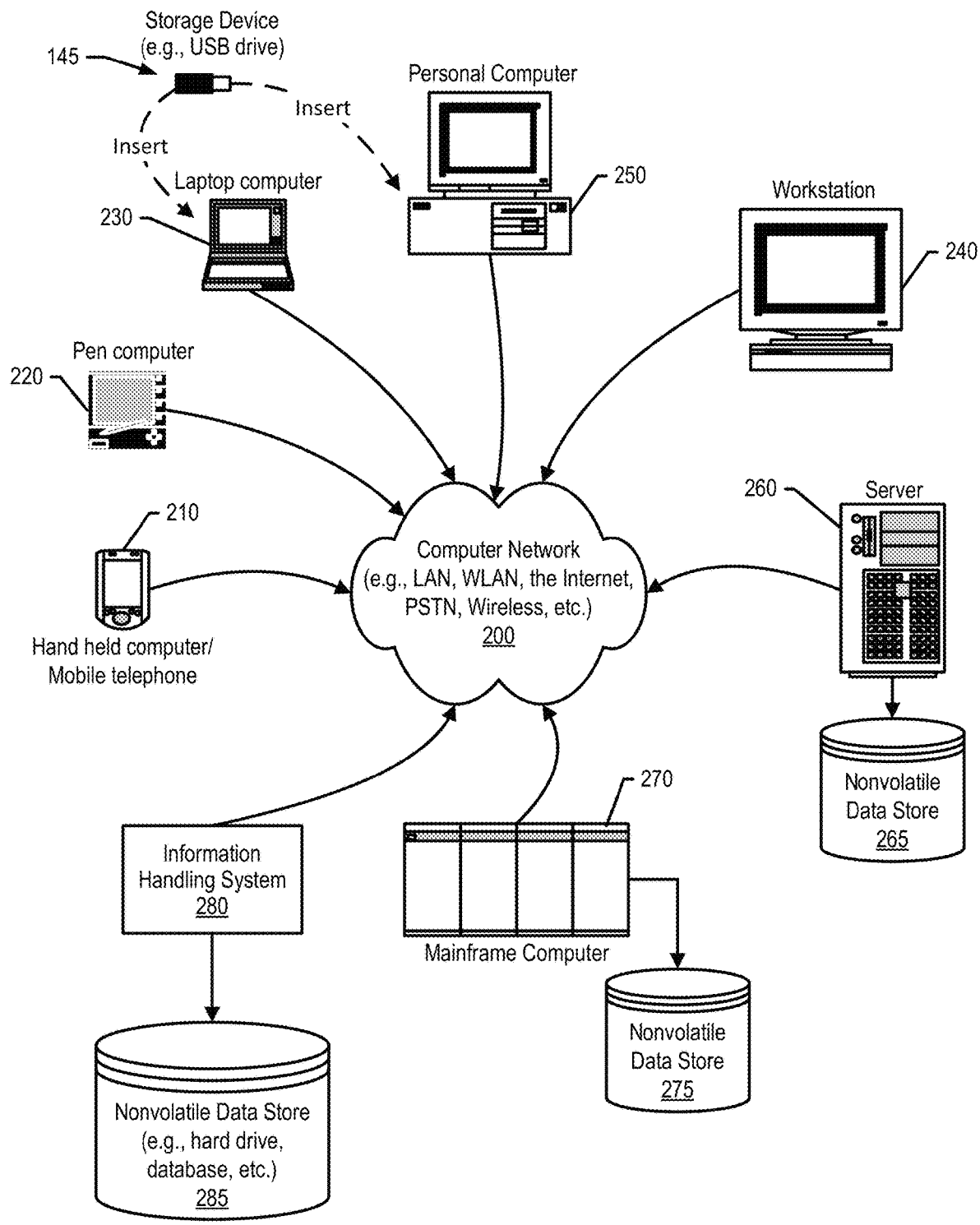
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, todays automated approaches identify parent->child relations at the class level. Today's approaches, however, do not account for detail hierarchical or unidirectional (single direction) associations (parent->child associations) between entities (terms, documents), such as 'Rose is a type of flower' but 'Flower is not a type of Rose'. As a result, businesses manually evaluate and enter hierarchical or unidirectional associations (parent->child associations) between entities, thus necessitating a large amount of time and cost, domain expertise, and producing subjective results.

FIGS. 3 through 8 depict an approach that can be executed on an information handling system that discovers unidirectional associations between business terms or documents based on supervised learning. The approach applies lexical relations feature learning algorithms on a reference dataset and uses the reference dataset feature learning results to train a machine learning model. The approach then applies the lexical relations feature learning algorithms on a user dataset and feeds the user dataset feature learning results into the trained machine learning model. In turn, the trained machine learning model outputs unidirectional associations of the user dataset, which the approach uses to build hierarchical relationships among the business terms. The approach then uses the hierarchical relationships to manage overall cognitive data governance of the user dataset. In one embodiment, the approach also uses common words and fuzzy features to train the machine learning model. In another embodiment, the approach discovers both 'is type of' and 'has type' directed associations using separate binary classifiers (machine learning models) for each type of association.

As described herein, unidirectional lexical relations pertain to hypernyms, hyponyms, meronyms and holonyms. Also as described herein, feature learning is a set of techniques that allows a system to automatically discover representations needed for feature detection or classification from raw data. This allows a machine to both learn the features and use the learned features to perform a specific task.

In one embodiment, the approach uses the unidirectional association results to find true directed associations among all unique combination of business terms to build a hierarchical relationship for cognitive data governance management. For example, knowing that a term B is a sub-type of term A and if a given regulation R1 has to be applied on term A, then the relationship understanding assists the approach in automatically applying the business regulations on term B as well. In another example, in Asset to Term mapping solution, utilizing the relationship information assists the approach in proposing term B as a potential candidate to the asset for which term A was found to be the best candidate.

Figure 3:
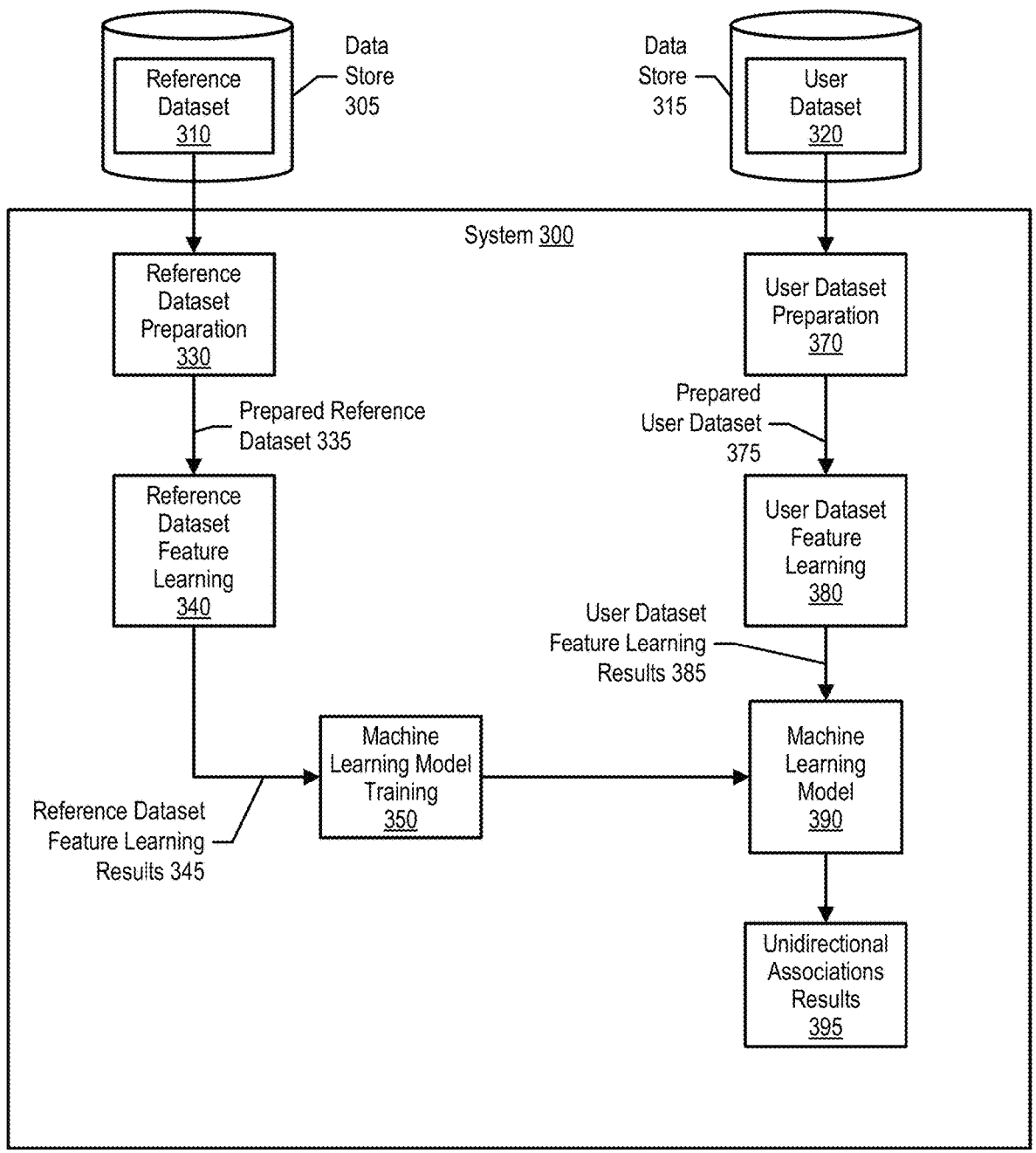
FIG. 3 is an exemplary diagram depicting a system that trains a machine learning model based on a reference dataset and uses the trained machine learning model to discover unidirectional associations among terms or documents in a user dataset.

FIG. 3 is an exemplary diagram depicting a system that trains a machine learning model based on a reference dataset and uses the trained machine learning model to discover unidirectional associations among terms or documents in a user dataset.

System 300 retrieves reference dataset 310 from data store 305 and commences reference dataset preparation 330. Reference dataset 310, in one embodiment, is industry model proprietary data created manually by industry experts and includes raw term-to-term data for 'is type of' associations.

Data preparation 330 includes data preprocessing that filters reference data set 310 by keeping only the terms combinations having directed associations while discarding unrelated terms. Data preparation 330 assigns a label of '1' for each record that includes terms with a true association indicated in reference dataset 310. Data preparation 330 also generates data records for label 0 by making all possible combinations of unrelated terms from a given labeled dataset and by reversing the direction of association for the labelled records. For example, if term A 'is a type of' term B is a true association given in the dataset (label=1), then reversing the direction of association to term B 'is a type of' term A is stored as label=0 (see FIG. 6 and corresponding text for further details). In addition, data preparation 330 concatenates and cleans up (removes special symbols, etc.) short and long descriptions of business terms depending on if user dataset 320 also has terms with at least a single line description to extract same features from the descriptions.

Next, system 300 performs lexical relations feature learning 340 on prepared reference dataset 335, which involves detecting lexical relations (hypernym, hyponym, meronym and holonyms) using, in one embodiment, Wordnet. Wordnet is a lexical database of English words which are interlinked by means of conceptual-sematic and lexical relations.

During lexical relations feature learning, system 300 groups different part of speech tags into sets of cognitive synonyms, referred to herein as "synsets." In addition, to enable fuzzy matching, system 300 uses fuzzy features and common words to detect common word occurrences between related terms used as separate feature. Examples of lexical relations are:

Hypernym: "Plant is an Organism," where Organism is the hypernym of plant;

Hyponym: "Perrenial is a type of Plant," where perennial is a hyponym of plant;

Holonym: "Plantae is a member of Plant family," where Plantae is the member holonym of plant; and Meronym: "Wheel is a part of Car," where wheel is a meronym of car.

In one embodiment, system 300 builds a list of term documents x and associated term documents y by concatenating term names, short descriptions, and long descriptions, and then removing punctuations and stop-words. System 300 determines a count of matches for learned features such as hypernyms, hyponyms, meronyms and holonyms between x and y and then normalizes the count by dividing the count by a total synsets count of associated term or documents (see FIG. 6 and corresponding text for further details). System 300 also learns other features such as common words and fuzzy ratios between term document x and associated term document y.

System 300 then uses reference dataset feature learning results 345 to train machine learning model 390 via machine learning model training 350. In one embodiment, system 300 trains separate binary classifiers (machine learning models) for each type of relationships ('is a type of', 'has a type of') using the approach discussed herein. In turn, machine learning model 390 is now ready to accurately identify unidirectional associations within user dataset 320 and prevent overfitting in the process (discussed below).

System 300 retrieves user dataset 320 from data store 315 and prepares user dataset 320 via user dataset preparation 370. Data preparation 370 generates all possible unique combinations of user terms in user dataset 320 and cleans up/concatenates short and long descriptions of user terms to perform subsequent steps discussed below (see FIG. 7 and corresponding text for further details).

Next, system 300 feeds prepared user dataset 375 into user dataset lexical relations feature learning 380, which performs steps similar to stage 340 discussed above. User dataset lexical relations feature learning 380 builds all possible term to term or document to document combinations from the prepared user dataset 320 and features are extracted accordingly.

System 300 then feeds user dataset feature learning results 385 into trained machine learning model 390. Machine learning model 390 uses the feature learning to predict associations of entities in user dataset 320 and generate unidirectional associations results 390 (see FIG. 8 and corresponding text for further details). In one embodiment, system 300 uses unidirectional associations results 390 to build a hierarchical relationship among business terms of an enterprise for an enhanced cognitive data governance.

Figure 4:
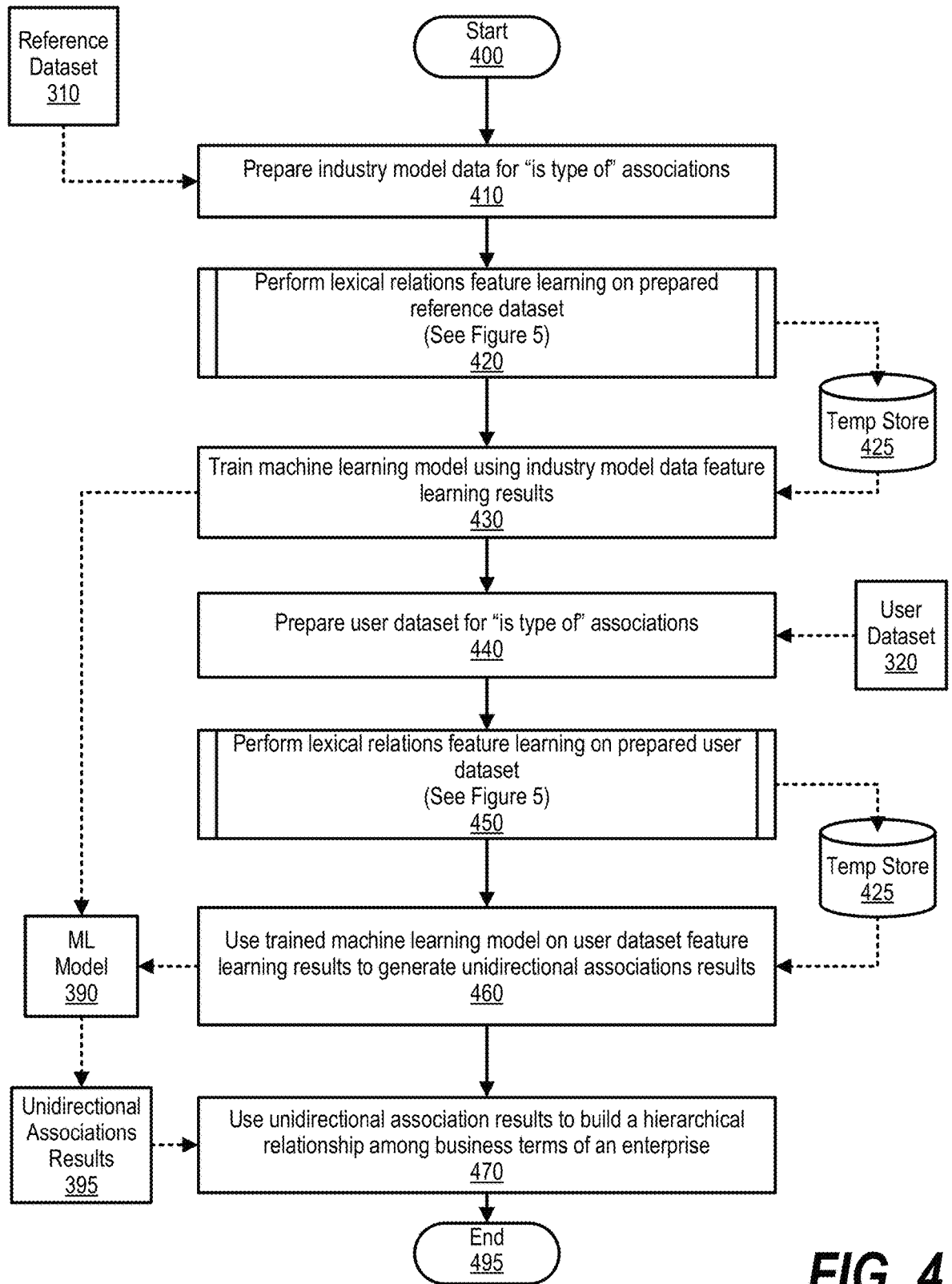
FIG. 4 is an exemplary flowchart showing steps taken to use a reference dataset to train a machine learning model and use the trained machine learning model to generate unidirectional association results of a user dataset.

FIG. 4 is an exemplary flowchart showing steps taken to use a reference dataset to train a machine learning model and use the trained machine learning model to generate unidirectional association results of a user dataset. Processing commences at 400 whereupon, at step 410, the process prepares reference dataset 310 for "is type of" associations (see FIG. 6 and corresponding text for further details). In one embodiment, the process performs similar steps shown in FIG. 4 to identify other forms of associations, such as "'has type of" associations. The process, in this embodiment, trains separate binary classifiers (machine learning models) for each type of association.

At predefined process 420, the process applies lexical relations feature learning algorithms on the prepared reference dataset to derive numeric features for various lexical relations and stores the results in temporary store 425 (see FIG. 6 and corresponding text for processing details). At step 430, the process trains machine learning model 390 using the reference dataset feature learning results from temporary store 425.

At step 440, the process prepares user dataset 320 by generating all possible combinations of the terms-pair for feature learning on each terms-pair for next steps (see FIG. 7 and corresponding text for further details). At predefined process 450, the process performs lexical relations feature learning on the prepared user dataset to derive numeric features and stores the results in temporary store 425 (see FIG. 8 and corresponding text for processing details).

At step 460, the process uses trained machine learning model 390 on the user dataset feature learning results stored in temp store 425 to generate unidirectional associations results 390. Unidirectional associations results 390 differentiates the true directed associations (predicted label=1) from no directed association (predicted label=0) (see FIG. 8 and corresponding text for further details). At step 470, the process uses unidirectional associations results 390 to discover hierarchical relationship among business terms of an enterprise and use the hierarchical relationships to manage a more cognitive data governance of user dataset 320. FIG. 4 processing thereafter ends at 495.

Figure 5:
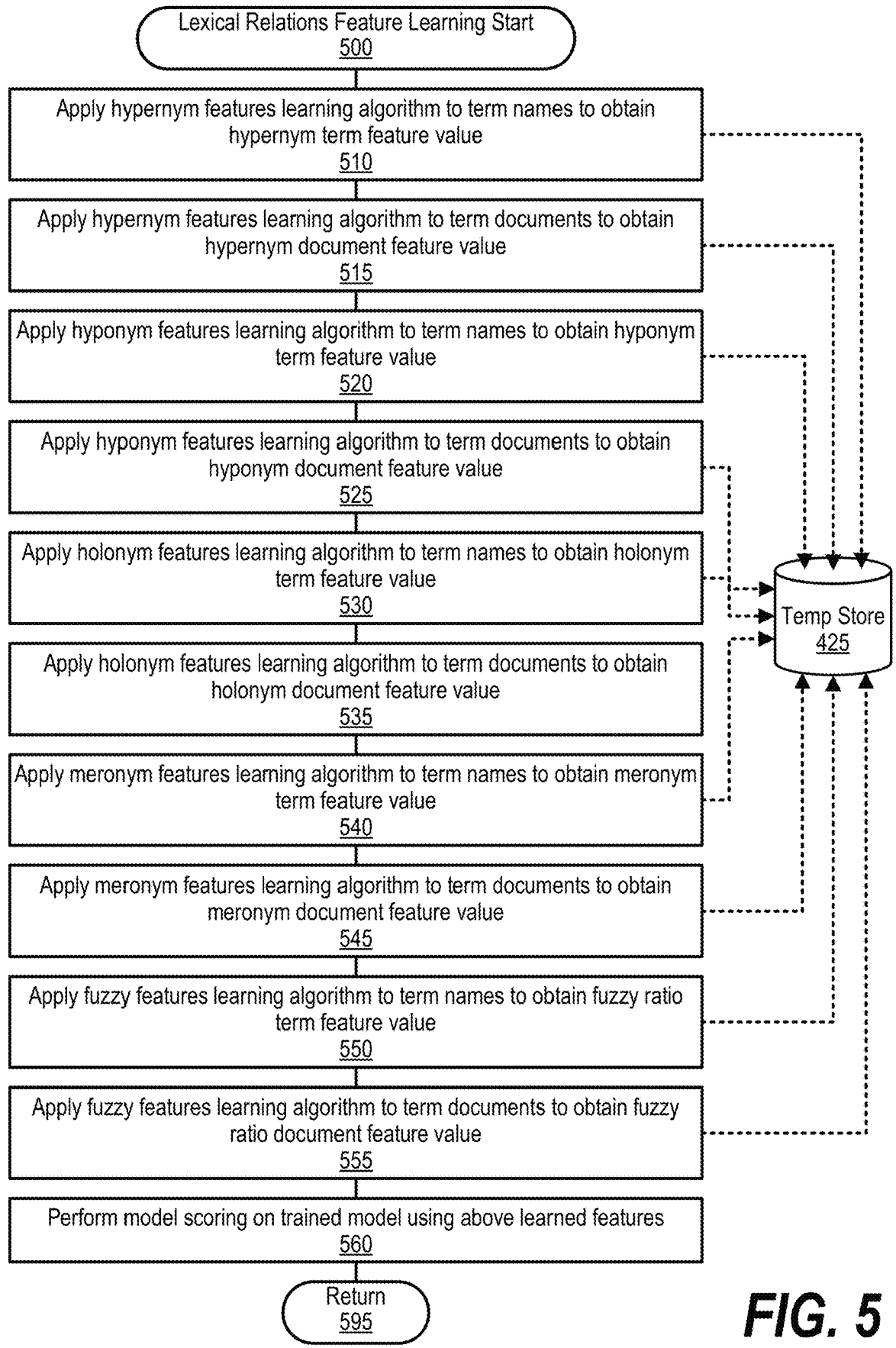
FIG. 5 is an exemplary flowchart depicting steps taken to apply lexical relations feature learning algorithms on a set of data.

FIG. 5 is an exemplary flowchart depicting steps taken to apply lexical relations feature learning algorithms on a set of data, such as reference dataset 310 and user dataset 320. FIG. 5 processing commences at 500 whereupon, at step 510, the process applies a hypernym feature learning algorithm to terms (names) and generates model scoring results. In one embodiment, for each row entry in prepared user dataset 375, the hypernym feature learning algorithm includes the following steps:
1. Assign 'term x' as a child and 'term y' as a parent.
2. Identify synonyms of each word in term x and generate list of term x's unique synonyms. Find parent (hypernym) of each of term x's unique synonyms (Group Z1).
3. Identify synonyms of each word in term y and generate list of term y's unique synonyms (Group Z2).
4. Compare group Z1 with group Z2 and normalize to generate hypernym score (see FIG. 8, result 812).

At step 515, the process applies the hypernym feature learning algorithm to term document (e.g., term+description) x and assumed associated term document y from user data using steps similar to step 510 above to obtain the value of a hypernym feature later used for model scoring on a trained model (see FIG. 8, result 814).

At step 520, the process applies a hyponym feature learning algorithm to data to obtain the value of hyponym feature for each assumed association. In one embodiment, for each entry, the hyponym feature learning algorithm includes the following steps:
1. Assign 'term x' as a child and 'term y' as a parent.
2. Identify synonyms of each word in term x and generate list of term x's unique synonyms (Group Z1).
3. Identify synonyms of each word in term y and generate list of term y's unique synonyms. Find child (hyponym relation) of each of term y's unique synonyms (Group Z2).
4. Compare group Z1 with group Z2 and normalize to generate hyponym score (see FIG. 8, result 816).

At step 525, the process applies the hyponym feature learning algorithm to term documents using steps similar to step 520 above to obtain the value of hyponym feature for associations between term document pairs (see FIG. 8, result 818).

At step 530, the process applies a holoynm feature learning algorithm to data to obtain the value of holonym feature later used for model scoring on a trained model. In one embodiment, for each entry, the holonym feature learning algorithm includes the following steps:
1. Assign 'term x' as a child and 'term y' as a parent.
2. Identify synonyms of each word in term x and generate list of term x's unique synonyms (Group Z1).
3. Identify synonyms of each word in term y and generate list of term y's unique synonyms. Find child (holoynm relation) of each of term y's unique synonyms (Group Z2).
4. Compare group Z1 with group Z2 and normalize to generate holoynm score (see FIG. 8, result 820).

At step 535, the process applies the holoynm feature learning algorithm to term documents using steps similar to step 530 above to obtain the value of holonym feature for term documents pairs (see FIG. 8, result 822).

At step 540, the process applies a meroynm feature learning algorithm to data and generate model scoring results. In one embodiment, for each entry, the meroynm feature learning algorithm includes the following steps:
1. Assign 'term x' as a child and 'term y' as a parent.
2. Identify synonyms of each word in term x and generate list of term x's unique synonyms (Group Z1).
3. Identify synonyms of each word in term y and generate list of term y's unique synonyms. Find child (meroynm relation) of each of term y's unique synonyms (Group Z2).
4. Compare group Z1 with group Z2 and normalize to generate meroynm score (see FIG. 8, result 824).

At step 545, the process applies the meroynm feature learning algorithm to term documents using steps similar to step 540 above to obtain the value of meronym feature later used for model scoring on a trained model (see FIG. 8, result 826).

At step 550, the process applies fuzzy feature learning algorithm to the terms to obtain fuzzy Q ratio and fuzzy W ratio for each term-term assumed associations in user data. At step 555, the process applies fuzzy feature learning algorithm to the term documents to obtain a fuzzy Q ratio and a fuzzy W ratio for each pair of term documents. At step 560, the process performs model scoring on the trained model using the above learned features. FIG. 5 processing thereafter returns to the calling routine (see FIG. 4) at 595.

FIG. 6 is an exemplary diagram depicting a prepared reference dataset for "is type of" associations and reference dataset feature learning results. System 300 generates prepared reference dataset 335 from stage 330 shown in FIG. 3 and includes raw term-to-term data for 'is type of' associations. In one embodiment, prepared reference dataset 335 includes columns (i) business term name 605; (ii) term short description 610, (iii) term long description 615, (iv) is type of (associated term) term name 620, (v) is type of (associated term) term short description 625, (vi) is type of (associated term) term long description 630, and (vii) class label 635. Examples of entries in prepared reference dataset 600 include:

Business Term Name 605: Accounts payable current and noncurrent;
Term Short Description 610: Accounts payable current and noncurrent. Accounts payable;
Term Long Description 615: Carrying value as of the balance sheet data of liabilities incurred (and for which invoices have typically been received) and payable to vendors for goods and services received that are used in an entity's business;

Is Type Of Term Name 620: Accounts payable and accrued liabilities current;

Is Type Of Term Short Description 625: Accounts payable and accrued liabilities current and noncurrent. Accounts payable and accrued liabilities. carrying values as of the balance sheet data of obligations incurred and payable;

Is Type Of Term Long Description 630: Pertaining to goods and services received from vendors; and for costs that are statutory in nature, are incurred in connection with contractual obligations, or accumulate over time and for which invoices have not yet been received or will not be rendered.

Labels 635: "1" if a true association.

In one embodiment, as discussed above, data records for label 0 are generated by making all possible combinations of unrelated terms from a given labeled data and also by reversing the direction of association for the labeled records (e.g. Term A 'is a type of' Term B is the true association given in data, hence the label is 1, then reversing the direction of association, i.e. Term B 'is a type of' Term A is kept as label 0).

Reference dataset feature learning results 345 includes, in one embodiment, data 642 through 668. Referring to the example shown in FIG. 6:

Data 642 indicates an amount of common words between identified term name and associated term name;

Data 644 indicates a hypernym feature engineered value for term name and associated term name;

Data 646 indicates a hypernym feature engineered value for term document and associated term document;

Data 648 indicates a hyponym feature engineered value for term name and associated term name;

Data 650 indicates a hyponym feature engineered value for term document and associated term document;

Data 652 indicates a holonym feature engineered value for term name and associated term name;

Data 654 indicates a holonym feature engineered value for term document and associated term document;

Data 656 indicates a meronym feature engineered value for term name and associated term name;

Data 658 indicates a meronym feature engineered value for term document and associated term document;

Data 660 indicates a Fuzzy Q ratio between term document and associated term document;

Data 662 indicates a Fuzzy W ratio between term document and associated term document;

Data 664 indicates a Fuzzy Q ratio between term name and associated term name;

Data 666 indicates a Fuzzy W ratio between term name and associated term name; and Data 668 indicates a true association between terms (1=associated, 0=unassociated).

FIG. 7 is an exemplary diagram depicting a user dataset and a prepared user dataset. User dataset 320 includes two columns, which are user terms 700 and user terms descriptions 710. In one embodiment, the approach discussed herein creates prepared user dataset 375 from user terms 700. In another embodiment, the approached discussed herein creates additional prepared user dataset entries by combining a user term with its corresponding description to form a document (access token suspended: identifies that the access token has been temporarily deactivated). In this embodiment, the approach adds entries to prepared user dataset 375 that are based on terms as well as documents (term+description) (see FIG. 8 and corresponding text for further details).

Prepared user dataset 420 includes terms X 430 and terms Y 440. The terms in column 730 are used as children in the feature learning algorithms while the terms in column 740 are used as parents in the feature learning algorithms. As can be seen, prepared user dataset includes two entries for each term pair that switches the parent-child relationship (742 and 744).

FIG. 8 is an exemplary diagram depicting user dataset feature learning results and unidirectional association results. User data 800 is derived from user dataset 320. Data 800 includes two terms in rows 802 and 804. In addition, data 800 combines each term with its corresponding description to create two documents in rows 802 and 804. The approach discussed herein evaluates the terms against each other as well as evaluates the documents against each other during feature learning stages.

User dataset feature learning results 385 includes four term (name) results (812, 816, 820, and 824) for each of the unidirectional lexical relations algorithms discussed herein (hypernyms, hyponyms, meronyms and holonyms). User dataset feature learning results 385 also includes four document results (814, 818, 822, and 826) for each of the unidirectional lexical relations algorithms discussed herein. In addition, in one embodiment, user dataset feature learning results 385 includes common words results 828 and/or fuzzy relation results 830, 832, 834, and 836.

User dataset feature learning results 385 are input into trained machine learning model 390 and machine learning model 390 generates unidirectional association result 390. The example in FIG. 8 shows that machine learning model 390 predicts a direction association that 'access token lifecycle status' is a parent of term 'access token expired.'

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

training a machine learning model using a reference dataset comprising a plurality of reference entries, wherein the machine learning model learns a first set of unidirectional associations between the plurality of reference entries;

preparing a user dataset for input into the trained machine learning model, wherein the user dataset comprises a plurality of user dataset entries, wherein the preparing comprises:
  creating a first one of the plurality of user dataset entries that assigns a first term as a parent to a second term;
  creating a second one of the plurality of user dataset entries that assigns the second term as a parent to the first term; and
  applying a set of lexical relations feature learning algorithms to the first user dataset entry and the second user dataset entry to generate a first set of user dataset feature learning results, wherein the first set of user dataset feature learning results includes a feature value result for each of the user dataset entries;
generating a second set of unidirectional associations between the plurality of user dataset entries included in the user dataset in response to inputting the prepared user dataset into the trained machine learning model, wherein the second set of unidirectional associations are based on the feature value results;
building a hierarchical relationship of the user dataset based on the second set of unidirectional associations; and
managing the user dataset based on the hierarchical relationship.

2. The method of claim 1 further comprising:
inputting the first set of user dataset feature learning results into the trained machine learning model to generate a portion of the second set of unidirectional associations.

3. The method of claim 1 wherein at least one of the set of lexical relations feature learning algorithms is selected from a group consisting of a hypernym feature learning algorithm, a hyponym feature learning algorithm, a holonym feature learning algorithm, and a meronym feature learning algorithm.

4. The method of claim 1 wherein the user dataset comprises a first description corresponding to the first user term and comprises a second description corresponding to the second user term, the method further comprising:
  combining the first term and the first description into a first document;
  combining the second term and the second description into a second document;
  creating a third one of the plurality of user dataset entries that assigns the first document as a parent to the second document;
  creating a fourth one of the plurality of user dataset entries that assigns the second document as a parent to the first document;
  applying the set of lexical relations feature learning to the third data entry and the fourth data entry to generate a second set of user dataset feature learning results; and
  inputting the second set of user dataset feature learning results into the trained machine learning model to generate a portion of the second set of unidirectional associations.

5. The method of claim 1 wherein the reference dataset comprises a subset of related entries and a subset of unrelated entries, the method further comprising:
  removing the subset of unrelated entries from the reference dataset to create a prepared reference dataset;
  applying a set of lexical relations feature learning algorithms to the prepared reference dataset to generate a set of reference dataset feature learning results; and
  performing the training of the machine learning model using the set of reference dataset feature learning results.

6. The method of claim 1 wherein the user dataset is devoid of classification information and is also devoid of data association information prior to the generating of the second set of unidirectional associations.

7. An information handling system comprising:
one or more processors;
a memory coupled to at least one of the processors;
a set of computer program instructions stored in the memory and executed by at least one of the processors in order to perform actions of:
  training a machine learning model using a reference dataset comprising a plurality of reference entries, wherein the machine learning model learns a first set of unidirectional associations between the plurality of reference entries;
  preparing a user dataset for input into the trained machine learning model, wherein the user dataset comprises a plurality of user dataset entries, wherein the preparing comprises:
    creating a first one of the plurality of user dataset entries that assigns a first term as a parent to a second term;
    creating a second one of the plurality of user dataset entries that assigns the second term as a parent to the first term; and
    applying a set of lexical relations feature learning algorithms to the first user dataset entry and the second user dataset entry to generate a first set of user dataset feature learning results, wherein the first set of user dataset feature learning results includes a feature value result for each of the user dataset entries;
  generating a second set of unidirectional associations between the plurality of user dataset entries included in the user dataset in response to inputting the prepared user dataset into the trained machine learning model, wherein the second set of unidirectional associations are based on the feature value results;
  building a hierarchical relationship of the user dataset based on the second set of unidirectional associations; and
  managing the user dataset based on the hierarchical relationship.

8. The information handling system of claim 7 wherein the processors perform additional actions comprising:
  inputting the first set of user dataset feature learning results into the trained machine learning model to generate a portion of the second set of unidirectional associations.

9. The information handling system of claim 7 wherein at least one of the set of lexical relations feature learning algorithms is selected from a group consisting of a hypernym feature learning algorithm, a hyponym feature learning algorithm, a holonym feature learning algorithm, and a meronym feature learning algorithm.

10. The information handling system of claim 7 wherein the user dataset comprises a first description corresponding to the first user term and comprises a second description corresponding to the second user term, and wherein the processors perform additional actions comprising:

combining the first term and the first description into a first document;

combining the second term and the second description into a second document;

creating a third one of the plurality of user dataset entries that assigns the first document as a parent to the second document;

creating a fourth one of the plurality of user dataset entries that assigns the second document as a parent to the first document;

applying the set of lexical relations feature learning to the third data entry and the fourth data entry to generate a second set of user dataset feature learning results; and inputting the second set of user dataset feature learning results into the trained machine learning model to generate a portion of the second set of unidirectional associations.

11. The information handling system of claim 7 wherein the reference dataset comprises a subset of related entries and a subset of unrelated entries, and wherein the processors perform additional actions comprising:

removing the subset of unrelated entries from the reference dataset to create a prepared reference dataset;

applying a set of lexical relations feature learning algorithms to the prepared reference dataset to generate a set of reference dataset feature learning results; and performing the training of the machine learning model using the set of reference dataset feature learning results.

12. The information handling system of claim 7 wherein the processors perform additional actions comprising wherein the user dataset is devoid of classification information and is also devoid of data association information prior to the generating of the second set of unidirectional associations.

13. A computer program product stored in a computer readable storage medium, comprising computer program code that, when executed by an information handling system, causes the information handling system to perform actions comprising:

training a machine learning model using a reference dataset comprising a plurality of reference entries, wherein the machine learning model learns a first set of unidirectional associations between the plurality of reference entries;

preparing a user dataset for input into the trained machine learning model, wherein the user dataset comprises a plurality of user dataset entries, wherein the preparing comprises:

creating a first one of the plurality of user dataset entries that assigns a first term as a parent to a second term;

creating a second one of the plurality of user dataset entries that assigns the second term as a parent to the first term; and applying a set of lexical relations feature learning algorithms to the first user dataset entry and the second user dataset entry to generate a first set of user dataset feature learning results, wherein the first set of user dataset feature learning results includes a feature value result for each of the user dataset entries;

generating a second set of unidirectional associations between the plurality of user dataset entries included in the user dataset in response to inputting the prepared user dataset into the trained machine learning model, wherein the second set of unidirectional associations are based on the feature value results;

building a hierarchical relationship of the user dataset based on the second set of unidirectional associations; and managing the user dataset based on the hierarchical relationship.

14. The computer program product of claim 13 wherein the information handling system performs further actions comprising:

inputting the first set of user dataset feature learning results into the trained machine learning model to generate a portion of the second set of unidirectional associations.

15. The computer program product of claim 13 wherein at least one of the set of lexical relations feature learning algorithms is selected from a group consisting of a hypernym feature learning algorithm, a hyponym feature learning algorithm, a holonym feature learning algorithm, and a meronym feature learning algorithm.

16. The computer program product of claim 13 wherein the user dataset comprises a first description corresponding to the first user term and comprises a second description corresponding to the second user term, and wherein the information handling system performs further actions comprising:

combining the first term and the first description into a first document;

combining the second term and the second description into a second document;

creating a third one of the plurality of user dataset entries that assigns the first document as a parent to the second document;

creating a fourth one of the plurality of user dataset entries that assigns the second document as a parent to the first document;

applying the set of lexical relations feature learning to the third data entry and the fourth data entry to generate a second set of user dataset feature learning results; and inputting the second set of user dataset feature learning results into the trained machine learning model to generate a portion of the second set of unidirectional associations.

17. The computer program product of claim 13 wherein the reference dataset comprises a subset of related entries and a subset of unrelated entries, and wherein the information handling system performs further actions comprising:

removing the subset of unrelated entries from the reference dataset to create a prepared reference dataset;

applying a set of lexical relations feature learning algorithms to the prepared reference dataset to generate a set of reference dataset feature learning results; and performing the training of the machine learning model using the set of reference dataset feature learning results.

\* \* \* \* \*